(12) United States Patent
Crane

(10) Patent No.: US 6,449,127 B1
(45) Date of Patent: *Sep. 10, 2002

(54) LOW MASS DISC DRIVE SUSPENSION

(75) Inventor: Peter Crane, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/469,975

(22) Filed: Dec. 21, 1999

Related U.S. Application Data

(63) Continuation of application No. 09/043,009, filed as application No. PCT/US97/21819 on Nov. 14, 1997.
(60) Provisional application No. 60/054,164, filed on Jul. 29, 1997.

(51) Int. Cl.7 ................................................. G11B 5/48
(52) U.S. Cl. ..................................................... 360/244.2
(58) Field of Search ........................... 360/244.2, 244.8, 360/245, 245.4

(56) References Cited

U.S. PATENT DOCUMENTS

| | | | | |
|---|---|---|---|---|
| 5,557,488 A | * | 9/1996 | Hamilton et al. | 360/104 |
| 5,602,699 A | * | 2/1997 | Khan | 360/104 |
| 5,657,187 A | * | 8/1997 | Hatch et al. | 360/104 |
| 5,663,854 A | * | 9/1997 | Grill et al. | 360/104 |
| 5,719,720 A | * | 2/1998 | Lee | 360/71 |
| 6,088,192 A | * | 7/2000 | Riener et al. | 360/104 |

* cited by examiner

Primary Examiner—George J. Letscher
(74) Attorney, Agent, or Firm—Westman, Champlin & Kelly

(57) ABSTRACT

A suspension (22, 102, 2190) supports a slider assembly (20, 204) in a disc drive (10). The suspension (22, 102, 190) includes a longitudinal axis (48, 114, 210), a proximal mounting section (40, 106) for mounting to a rigid track accessing arm (24, 204), a distal mounting section (42, 108) for supporting the slider assembly (20, 204), and first and second laterally spaced suspension beams (44, 46, 110, 112, 206, 208) extending from the proximal mounting section (40, 106) to the distal mounting section (42, 108). The first and second suspension beams (44, 46, 110, 112, 206, 208) have inside and outside edges (66, 68, 124, 126) relative to the longitudinal axis (48, 114, 210) and are flat from the inside edges (66, 124) to the outside edges (68, 126). A first preload bend (80, 113, 214) is formed in the first and second suspension beams (44, 46, 110, 112, 206, 208) transverse to the longitudinal axis (48, 114, 210).

19 Claims, 9 Drawing Sheets

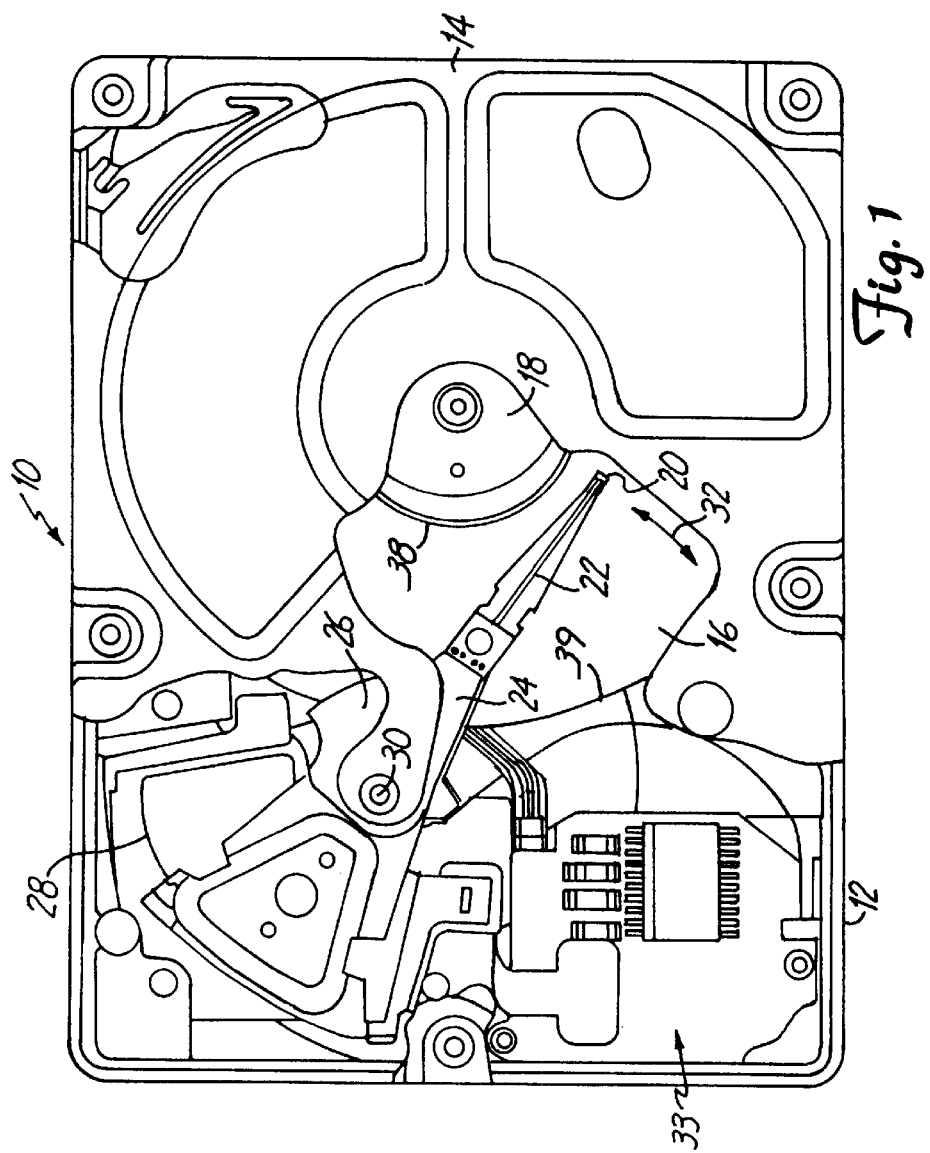

LOW MASS DISC DRIVE SUSPENSION

CROSS-REFERENCE TO RELATED APPLICATION

This application is a continuation of and claims priority benefits from U.S. application Ser. No. 09/043,009, entitled "LOW MASS SUSPENSION DISC DRIVE SUSPENSION," filed Mar. 4, 1998, which is a 371 of PCT/US97/21819, filed Nov. 4, 1997, which claims the benefit of U.S. Provisional Application Serial No. 60/054,164, entitled "LOW MASS SUSPENSION ENABLING MICRO ACTUATION," filed Jul. 29, 1997.

BACKGROUND OF THE INVENTION

The present invention relates to disc drive data storage systems and, more particularly, to a low mass suspension formed by a pair of laterally spaced suspension beams.

Disc drive data storage systems use rigid discs which are coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces. Each slider is supported by a track accessing arm and a suspension. The track accessing arms move the sliders from track to track across the surfaces of the discs under control of electronic circuitry.

The suspension connects the track accessing arm to the slider. The suspension provides a preload force, in the range of 0.5 gmf to 4.0 gmf, which forces the slider toward the disc surface. The preload force is generated by forming a preload bend in the suspension, which becomes elastically deformed when the track accessing arm, suspension and slider are loaded into the disc drive. The preload bend is typically positioned near the proximal end of the suspension, adjacent to the track accessing arm. The suspension has a comparatively rigid portion which transfers the preload force from the elastically deformed preload bend to the slider. The rigid portion is typically made by forming stiffening webs or flanges along the longitudinal edges of the suspension. Alternatively, the rigid portion may be formed by depositing circuit layers on the suspension material. The rigid portion of the suspension is typically referred to as a "load beam".

Additionally, the suspension is flexible in the slider pitch and roll directions to allow the slider to follow the disc topography. This pitch and roll flexibility is obtained from a gimbal structure, which is typically a separate piece part that is welded to the load beam portion of the suspension. The separate gimbal is usually formed from a thinner material than the load beam to increase its pitch and roll compliance. Alternatively, the gimbal may be formed from partially etched material or from the load beam material itself. Partially etched gimbals are subject to wide variations in pitch and roll stiffness as the etched thickness varies over a typical range. Gimbals formed from the load beam material restrict the suspension to be made of thin stock which can support only small preload forces.

The slider includes an air bearing surface which faces the disc surface. As the disc rotates, the air bearing surface pitches and rolls to an equilibrium position wherein a center of bearing pressure is defined on the air bearing surface. The desired location of the pressure center is defined as the air bearing load point. Variations in pitch and roll moments applied by the gimbal cause deviations in the location of the pressure center away from the desired air bearing load point.

The point at which the suspension applies the preload force to the slider is usually directly above the air bearing load point. The preload force is typically applied to the slider through a dimple or load button which bears on the back surface of the slider Alternatively, the preload force is applied through the gimbal structure. This point of preload application is defined as the suspension load point.

Microactuators are now being developed for adjusting the position of the slider and transducer in an off-track direction. Either of the above methods of applying the preload force to the slider restricts the off-track motion of the slider at the suspension load point. When the preload force is applied to the slider through a dimple, the microactuator must overcome friction between the dimple and the slider surface to move the slider in the off-track direction. When the preload force is applied to the slider through a gimbal, the microactuator must overcome the off-track stiffness of the gimbal to move the slider in the off-track direction.

Improved suspension structures that are adapted for microactuation are desired.

SUMMARY OF THE INVENTION

The suspension of the present invention includes a longitudinal axis, a proximal mounting section for mounting to a rigid track accessing arm, a distal mounting section for supporting a slider assembly, and first and second laterally spaced suspension beans extending from the proximal mounting section to the distal mounting section The first and second suspension beams have inside and outside edges relative to the longitudinal axis and are flat from the inside edges to the outside edges. A first preload bend is formed in the first, and second suspension beams transverse to the longitudinal axis.

BRIEF DESCRIPTION OF THE DRAWINGS

FIG. 1 is a top plan view of a disc drive data storage device according to one embodiment of the present invention.

DETAILED DESCRIPTION OF THE PREFERRED EMBODIMENTS

Figure 2A:
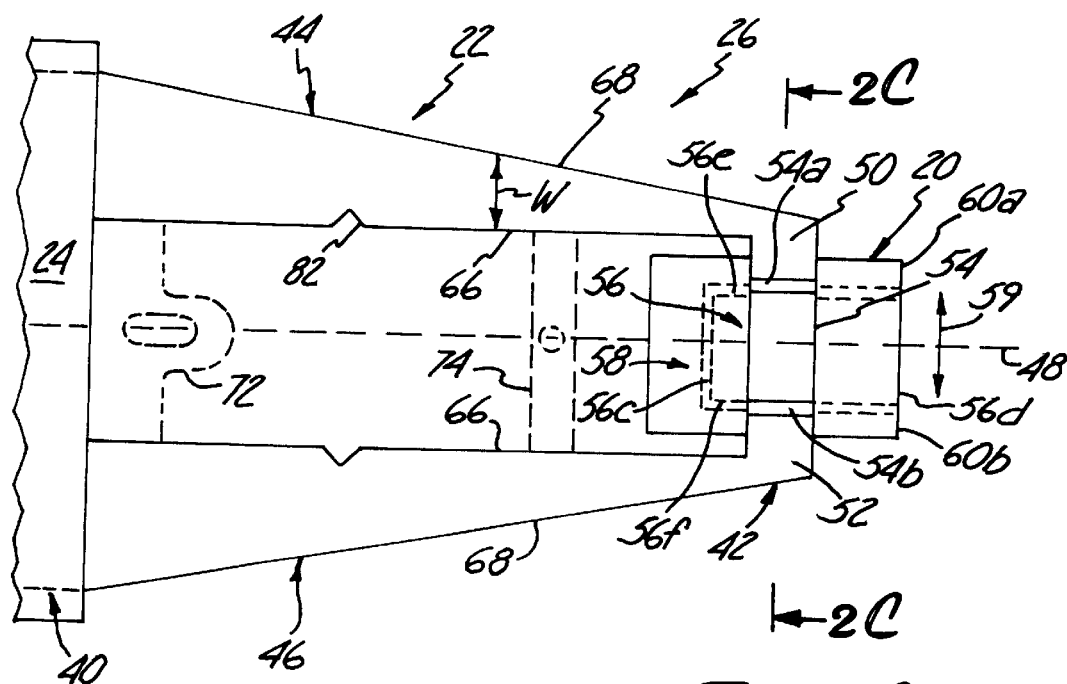
FIG. 2A is a top plan view of an actuator assembly of the disc drive shown in FIG. 1.

FIG. 1 is a plan view of a disc drive 10 according to one embodiment of the present invention. Disc drive 10 includes a housing with a base 12 and a top cover 14 (sections of top cover 14 are removed for clarity). Disc drive 10 further includes a disc pack 16, which is mounted on a spindle motor (not shown) by a disc clamp 18. Disc pack 16 includes a plurality of individual discs which are mounted for co-rotation about a central axis. Each disc surface has an associated disc head slider/microactuator assembly 20 which is mounted to disc drive 10 for communication with the disc surface. Each slider/microactuator assembly 20 is supported by a suspension 22 which, in turn, is supported by a rigid track accessing arm 24 of an actuator assembly 26.

The actuator assembly shown in FIG. 1 is of the type known as a rotary moving coil actuator and includes a voice coil motor (VCM), shown generally at 28. Voice coil motor 28 rotates actuator assembly 26 with its attached slider/microactuator assemblies 20 about a pivot shaft 30 to position slider 20 over a desired data track under the control of electronic circuitry 33. Slider/microactuator assembly 20 travels along an arcuate path 32 between a disc inner diameter (ID) 38 and a disc outer diameter (OD) 39.

Figure 2B:
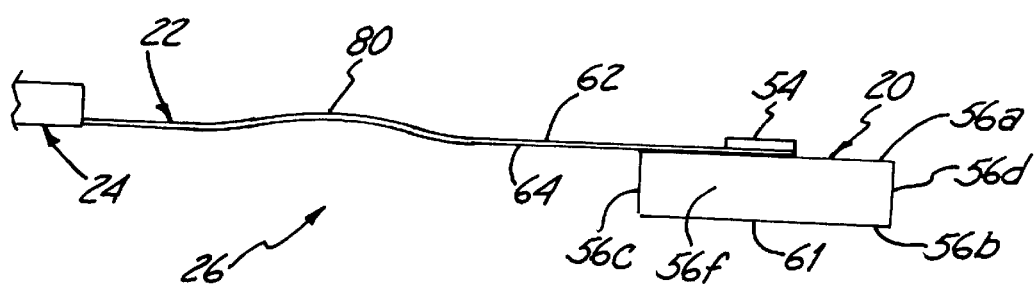
FIG. 2B is a side plan view of the actuator assembly.

Suspension 22 is shown in greater detail in FIGS. 2A and 2B. FIG. 2A is a top plan view of the distal end of actuator assembly 26. FIG. 2B is a side plan view of the distal end of actuator assembly 26. Suspension 22 has a proximal mounting section 40 (shown in phantom), a distal mounting section 42, a pair laterally spaced suspension beams 44 and 46 and a longitudinal axis 48. Proximal mounting section 40 is supported by track accessing arm 24. A variety of mounting techniques can be used to attach proximal mounting section 40 to track accessing arm 24.

Suspension beams 44 and 46 extend from proximal mounting section 40 to distal mounting section 42 along longitudinal axis 48. Suspension beams 44 and 46 terminate at a pair of slider mounting pads 50 and 52, respectively, within distal mounting section 42, for supporting slider/microactuator assembly 20. An optional bridge structure 54 extends between slider mounting pads 50 and 52 and includes preformed bends 54A and 54B which raise bridge structure 54 relative to the top surface of slider/microactuator assembly 20.

The simple block representing slider/microactuator assembly 20 may include a slider body 56 only or slider body 56 in combination with a microactuator structure 58. In the embodiment shown in FIGS. 2A and 2B, slider mounting pads 50 and 52 are bonded to microactuator structure 58, which suspends slider body 56 beneath bridge structure 54 and free of physical contact with bridge structure 56. This allows slider body 56 to move freely in an off-track direction 59, transverse to longitudinal axis 48 without frictional or other structural interference from suspension 22.

Slider body 56 has a back surface 56a, a bearing surface 56b, a leading surface 56c, a trailing surface 56d and side surfaces 56e and 56f. A variety of microactuators can be used with the present invention, such as an electromagnetic device on top of slider body 56. Another microactuator device that is well suited for the suspension of the present invention is a piezoelectric device deposited on leading surface 56a of slider 56. Microactuator structure 48 may alternatively support slider body 56 along side surfaces 56e and 56f. For example, microactuator structure 58 can suspend slider body 56 between a pair of beams 60a and 60b which are attached to a point along side surfaces 56e and 56f. Slider support pads 50 and 52 are bonded to the top surface of beams 60a and 60b, respectively. Narrow beam springs located between beam 60a and slider side surface 56e and between beam 60b and slider side surface 56f support the slider while allowing the slider to move freely.

Figure 2C:
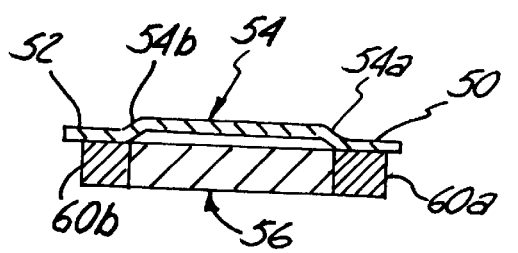
FIG. 2C is a cross-sectional view taken along lines 2C—2C of FIG. 2A.

Attaching the suspension to the microactuator structure at a point distant from the slider body allows the slider body to move freely in the off-track direction with very little actuation force. FIG. 2C is a sectional view taken along lines 2C—2C of FIG. 2A, which shown the spacing between bridge structure 54 and slider body 56 in greater detail. In an alternative embodiment, there is no microactuator structure, and slider support pads are bonded directly to back surface 56a of slider body 56.

In the embodiment shown in FIGS. 2A and 2B, beams 44 and 46 extend along the sides of slider/microactuator assembly 20, and the average longitudinal location,of the beam attachment at slider mounting pads 50 and 52 corresponds to an air bearing load point 61 of slider body 56 (shown in FIG. 2B); As the disc rotates beneath air bearing surface 56b, the slider body pitches and rolls to an equilibrium position wherein a center bearing pressure is defined on the air bearing surface. The desired location of the pressure center is defined as the air bearing load point 61. Slider mounting pads 50 and 52 are attached to microactuator structure 58 such that air bearing load point 61 lies substantially directly between the suspension beam attachment points. However, this embodiment has a disadvantage that a number of potential recording tracks cannot be accessed near the inner diameter of the disc since the suspension beam adjacent the inner diameter must fit between slider/microactuator assembly 20 and the disc spindle hub. For example if there are 10,000 tracks per inch on the disc and suspension beams 44 and 46 extend about 0.010 inches from the side of slider/microactuator assembly 20, roughly 100 tracks are lost from the inner radius area of the disc.

Suspension 22, has no distinct separation into preload bend, load beam and gimbal areas. Both the preloading and gimbal flexure functions are obtained from suspension beams 44 and 46. Suspension beams 44 and 46 are longer than typical gimbal struts of the prior art, which results in similar pitch stiffness. The roll stiffness of suspension beams 44 and 46 is higher than typical gimbal struts because the beams are placed farther apart than typical gimbal struts. The high roll stiffness, however, is compatible with air bearing sliders having a single recording head mounted at the center of the trailing surface 56d of slider body 56. With the recording head mounted at the center of trailing surface 56d, the flying height of the recording head is relatively insensitive to roll stiffness.

Suspension 22 is made from a flat stock of stainless steel or similar material which has a thickness from 0.5 to 2.0 mils, for example. The flat stock of material is lithographically patterned and chemically etched to form suspension beams 44 and 46. Suspension 22 has an upper surface 62 and a lower surface 64, and suspension beams 44 and 46 have an inside edge 66 and an outside edge 68 relative to longitudinal axis 48. Suspension 22 has no stiffening webs or flanges along the length of beams 44 and 46. Rather, suspension beams 44 and 46 are substantially flat from inside edge 66 to outside edge 68.

Suspension beams 44 and 46 have a width W which tapers along longitudinal axis 48, with the wide end of the beams being supported by track accessing arm 24 and the narrow end of the beams supporting slider/microactuator assembly 20. Width W preferably narrows linearly from a maximum width at track accessing arm 24 to a minimum width at slider assembly 20. In an alternative embodiment, beams 44 and 46 have a constant width from track accessing arm 24 to slider assembly 20.

A preload bend 80 (shown in FIG. 2B) is formed in suspension beams 44 and 46 in a direction transverse to longitudinal axis 48. Preload bend 80 becomes elastically deformed (as shown in FIG. 2B) when track accessing arm 24, suspension 22 and slider/microactuator assembly 20 are loaded into the disc drive.

Notches 82 and 84 are formed along inside edges 66 of beams 44 and 46 for defining a weak point in the beams which aids in consistent location of preload bend 80 along longitudinal axis 48. Notches 82 and 84 may be located along inside edges 66 only, outside edges 68 only or along both inside edges 66 and outside edges 68. Alternatively there may be no notches used. In the prior art, the preload bend location is typically set by the tooling used to form the bend. Variations in tool set-up can cause variations in the preload bend location of about +/−0.06 mm, for example. Notches 82 and 84 increase the stress level in adjacent material during the preload bend forming process, such that large plastic deformations occur near the desired bend location. Therefore, the majority of plastic strain defining the preload bend is localized, regardless of variations in tooling. In this manner, the placement of is preload bend 80 is controlled more accurately than in the prior art. Alternatively, specifications on tool accuracy may be relaxed with a similar level of bend placement accuracy.

With the tapered suspension beams shown in FIG. 2A, the beams have a nearly uniform bending stress level along their length in response to elastic deformation of preload bend 80, except for end effects in the suspension where the suspension connects to relatively rigid components. In contrast, suspension beams with a constant width have a maximum stress due to the elastic deformation of preload bend 80 at the track accessing arm end of the beams, which decreases to a small stress at the slider end of the beams. This maximum stress is determined by the beam width which is set by the lithographic masking and chemical etching process. Tapered beams also have less mass for a given maximum bending stress level and therefore have less tendency to separate from the disc surface under shock loading as compared to constant width beams. If the suspension beams taper to a point at the air bearing load point, the beams will have a minimum mass for a given bending stress level. Substantially all of the suspension material will be at the specified bending stress level, so no further mass reductions can be made without increasing the bending stress level above the specified level. This results in the best possible low frequency shock resistance.

Suspension beams 44 and 46 are substantially unconnected to one another between track accessing arm 24 and slider/microactuator assembly 20. However, suspension 22 may further include minimal tooling features such as features 72 and 74 (shown in phantom) which extend between the suspension beams for providing apertures, slots or other features for aiding in the alignment of track accessing arm 24, suspension 22 and slider/microactuator assembly 20 during assembly.

Figure 3A:
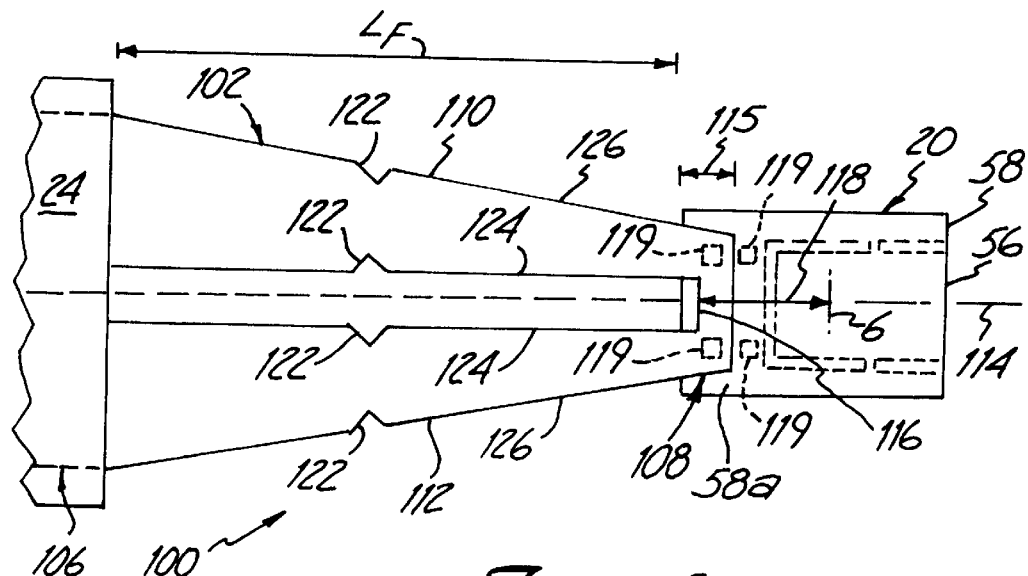
FIG. 3A is a top plan view of an actuator assembly according to an alternative embodiment of the present invention.
Figure 3B:
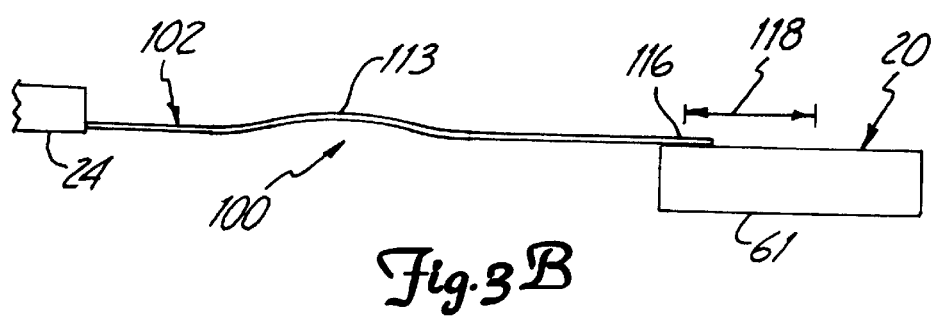
FIG. 3B is a side plan view of the actuator assembly shown in FIG. 3A.

FIGS. 3A and 3B illustrate an actuator assembly 100 in which the suspension beams are attached to the leading end of slider/microactuator structure 20 as opposed to the sides of the assembly, in accordance with an alternative embodiment of the present invention. FIG. 3A is a top plan view of the distal end of actuator assembly 10, and FIG. 3B is a side plan view of actuator assembly 100. The same reference numerals are used for the same or similar elements as were used in FIGS. 1–2. Actuator assembly 100 includes track accessing arm 24, slider/microactuator assembly 20 and suspension 102.

Suspension 102 includes proximal mounting section 106, distal mounting section 108, laterally spaced suspension beams 110 and 112 and longitudinal axis 114. Suspension beams 110 and 112 have a preload bend 113 formed transverse to longitudinal axis 114. Distal mounting section 108 extends over the top surface of slider/microactuator assembly 20 a distance 115 and is bonded to either microactuator structure 58 or slider body 56. In one embodiment, distal mounting section 108 is bonded to the top surface of a main body 58a of microactuator structure 58. Main body 58a has a plurality of electrical terminals 119 (shown in phantom), some of which may be electrically coupled to suspension 102 such that suspension 102 acts as a ground plans for the microactuator. The remaining terminals would be coupled to electrical control wires in a known manner. Main body 58a supports slider body 56 through beams 60a and 60b and narrow spring between 60a and 56e and between 60b and 56f.

Suspension beams 110 and 112 have an-effective free length $L_F$, which is measured from the distal end of track accessing arm 24 to the leading end of slider/microactuator assembly 20. Suspension 102 transfers a preload force from the elastically deformed preload bend 113 to slider/microactuator assembly 20 at a suspension load point 116. Suspension load point 116 is defined as the point along longitudinal axis 114 at which suspension 102 is first connected to slider/microactuator assembly 20 (in this case at the leading end of assembly 20).

By placing suspension load point 116 forward of the air bearing load point 61, suspension beams 110 and 112 may be placed closer together which decreases, the roll stiffness of suspension 102 and increases the number of usable data tracks at the inner radius area of the disc. This also results in a combined preload force and pitch moment being applied to slider/microactuator assembly 20 at suspension load point 116. The pitch moment is defined as the preload force times a longitudinal distance 118 between suspension load point 116 and air bearing load point 61. The correct pitch moment at suspension load point 116 results in a desired, substantially zero pitch moment at air bearing load point 61.

One method of obtaining the correct pitch moment is to place preload bend 113 at an appropriate position along the length of suspension beams 110 and 112. Notches 122 are formed along inside edges 124 and outside edges 126 of suspension beams 110 and 112 for accurately defining the location of preload bend 113 along length 120. For a set of suspension beams having a constant width along length 120, this location was found to be preferably about ⅓ the distance between track accessing arm 24 and suspension load point 116. For a set of tapered suspension beams with nearly constant bending stress, as described above, this location was found to be about ½ the distance between track accessing arm 24 and suspension load point 116.

Figure 4:
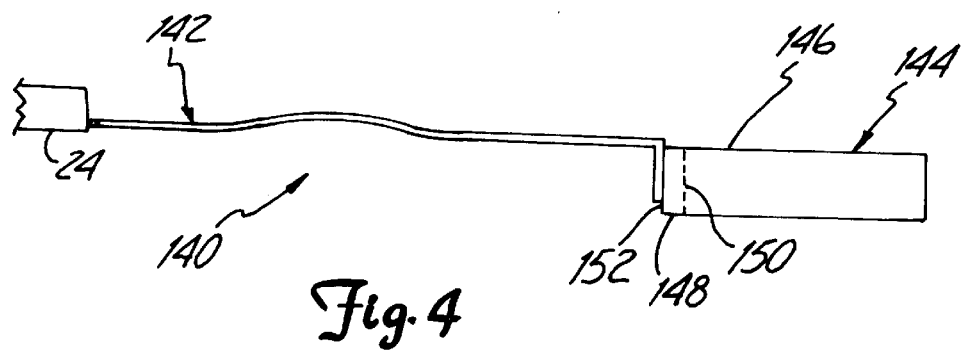
FIG. 4 is a top plan view of an actuator assembly having a suspension attached to a leading end of a slider assembly.

FIG. 4 is side plan view of an actuator assembly 140 according to another alternative embodiment of the present invention. Actuator assembly 140 includes track accessing arm 24, suspension 142 and slider/microactuator assembly 144. Suspension 142 is bonded to the leading surface of slider/microactuator assembly 144. Slider/microactuator assembly can include a slider body 146 only or, more preferably, can include slider body 146 in combination with a microactuator structure 148. Microactuator structure 148 is bonded to leading slider surface 150 during head wafer fabrication. Microactuator structure 148 is built up by a thick film method and then fired in place. After dicing the wafer into individual slider bodies, electrical connections are made to the microactuator electrical terminals. Suspension 142 is then attached to leading surface 152 of microactuator structure 148 with the electrical connections interposed between suspension 142 and microactuator structure 148 using an insulating epoxy or similar adhesive.

The electrical signals that are applied to the electrical terminals cause microactuator structure 148 to selectively expand and contract the relative distance between suspension 142 and the two ends of leading slider surface 15C to actuate slider body 144 in an off-track direction. This allows micropositioning of the read or write transducer carried by slider body 144 during read and write operations. Microactuator structure 148 may be formed of a piezoelectric material which includes a lead zirconate titanate (PZT) material, for example. However, other types of microactuators may be used with the present invention, such as electromagnetic, electrostatic, capacitive, fluidic, and thermal microactuators.

As mentioned above, the suspension shown in the previous figures has no stiffened load beam section. Stiffened load beam sections have been used in suspensions of the prior art to stabilize the dynamic response of the slider/suspension assembly by limiting out-of-plane deflection of the suspension under preload. The stiffened load beam has served to maintain a substantially planar suspension by limiting the elastic strain of the preloading to a small length near the track accessing arm. Since the suspension of the present invention has no stiffened load beam section, the suspension beams have elastic strain due to preloading throughout the length the beams, from the track accessing arm to the slider/microactuator assembly. Additional resonance control measures are therefore desired.

A suspension having tapered beams with vanishing widths at the longitudinal location of the air bearing load point most closely approaches the constant bending stress condition. This ideal can only be approximated due to bending stress risers at the ends of the suspension where the suspension attaches to relatively rigid components. This also provides a nearly constant curvature along the entire free length of the beams under elastic loading. If the suspension beams have a preload bend with a large radius of curvature, the preload bend will reverse under preloading such that the preloaded suspension will be nearly flat in a plane parallel with the disc. This is the ideal condition for the best off-track frequency response of the suspension.

Since it is difficult to form a preload bend such that the entire suspension beam is uniformly curved, it is more common to have a relatively sharp bend, which forms a "hump" of elastically strained material under preload as shown in FIGS. 2B, 3B and 4. The position of this hump can be varied with the bend forming tool such that the average deviation of spring material away from the ideal plane is minimized.

FIGS. 5–9 shown finite element modeling results that were used to determine a desired preload bend location for a suspension similar to that shown in FIGS. 3A and 3B. The slider was modeled with a length of 56 mils, a width of 42 mils and a mass of 2.0 mg, which is about 35 percent of industry standard dimensions. Suspension beams 110 and 112 were modeled as if etched from stainless steel flat stock material having a thickness of 1.2 mils. The suspension length from the distal end of the track accessing arm to the air bearing load point was 0.300 inches. The distance from the suspension load point 116 at the leading end of the slider to the air bearing load point 61 at the center of bearing pressure was 0.033 inches. Suspension beams 110 and 112 were modeled as tapering to a point having zero width at air bearing load point 61. The mass of the suspension was very small, resulting in a low frequency shock acceleration threshold of 651 gravities before separation between the slider and disc occurs. This approached an ideal value of 1000 gravities for a massless suspension with a 2.0 mg slider and 2.0 gmf preload. By comparison, a similar assembly using a typical suspension of the prior art had a shock acceleration threshold of only 340 gravities.

Figure 5A:
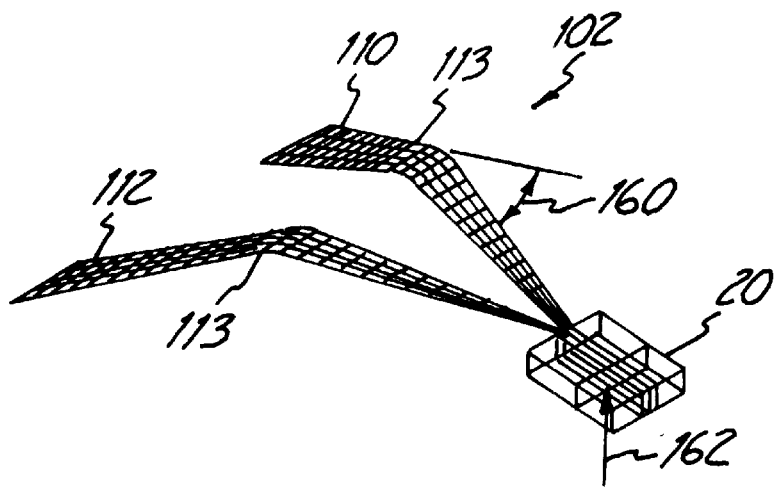
FIGS. 5A and 5B are isometric views of a finite element model of a suspension in the actuator assembly shown in FIG. 3A.

FIG. 5A is an isometric view of a finite element model of suspension 102. Suspension beams 110 and 112 were modeled with the preload bend 113 in each beam. Each preload bend 113 had a bend angle 160 of 35.8° and a bend radius of curvature of 0.050 inches. Thus, only a portion of the beam length was formed into a bend. Preload bends 113 were centered halfway along the effective free length of the beams, measured from the track accessing arm to the leading end of slider/microactuator assembly 20. There were no notches used to aid in bend location.

Figure 5B:
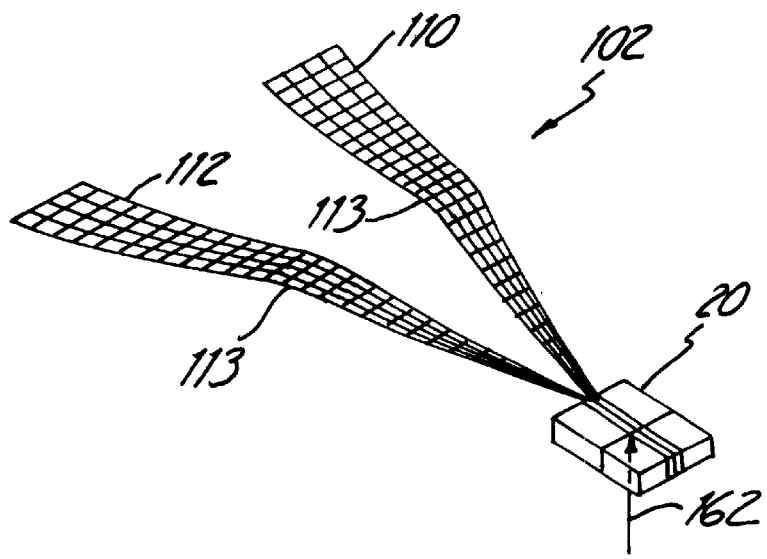

FIG. 5B is an isometric view of the finite element model shown in FIG. 5A, after adding an air bearing lifting force 162 applied to the air bearing surface of slider/microactuator assembly 20. The resulting bending stress along suspension beams 110 and 112 was at a uniform level of 40,000 psi at material locations that were distant from end effects. End clamping at track accessing arm 24 and slider/microactuator assembly 20 increased the bending stress at those locations to about 63,000 psi. Since the yield stress of fully hardened stainless steel in this example was specified as 180,000 psi, suspension beams 110 and 112 were not overstressed by preloading.

Figure 6:
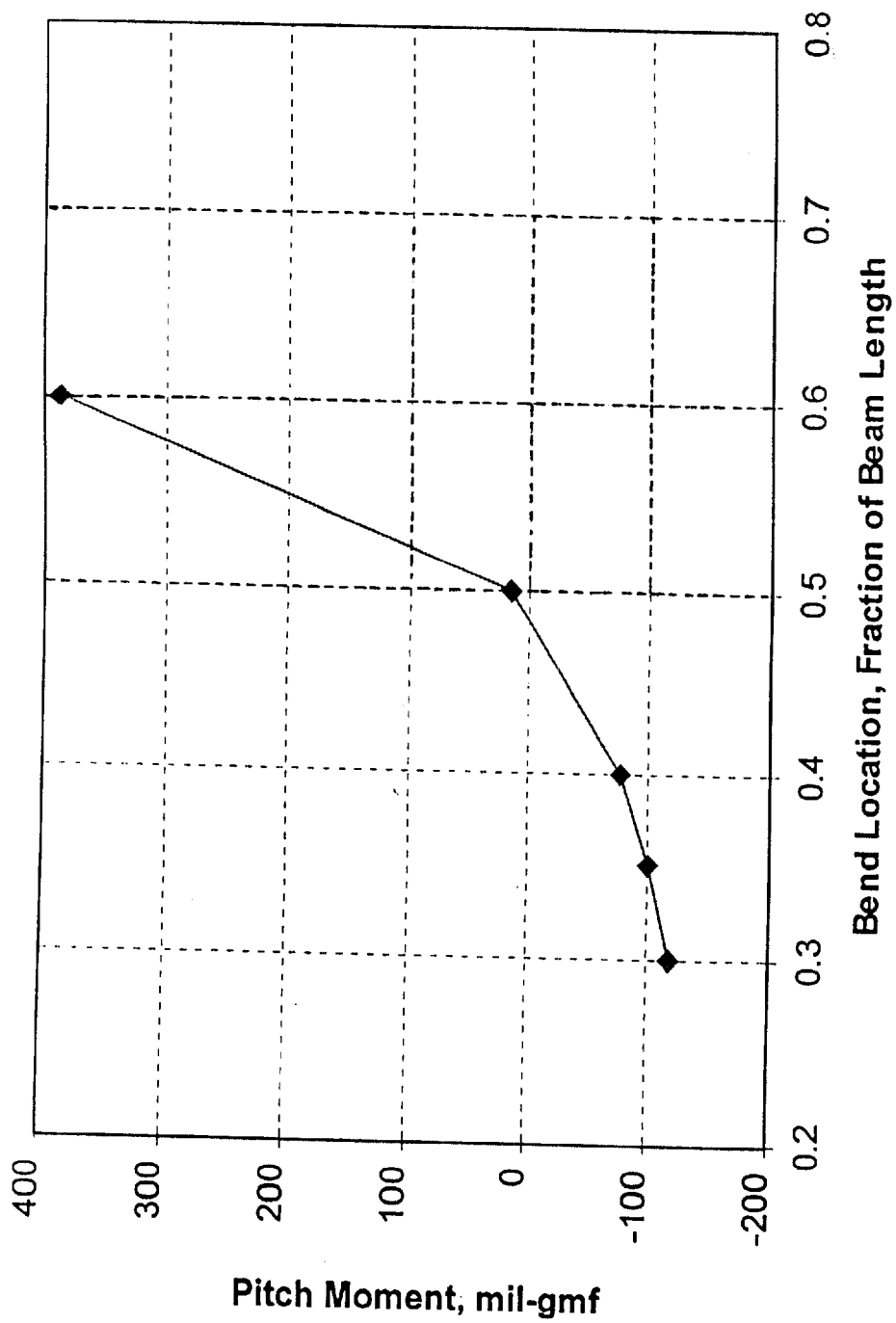
FIG. 6 is a plot of net pitch torsion at an air bearing load point versus preload bend location.

FIG. 6 is a plot of the net pitch torsion at air bearing load point 61 versus the preload bend location along the effective free length of suspension beams 110 and 112. As discussed above, it is desirable to have a nearly zero pitch torsion on the air bearing. Stiffness variations in the suspension and the signal wires cause larger variations in a non-zero pitch torsion value than in a zero pitch torsion value. The plot of FIG. 6 shows that a single preload bend at about half the effective beam length results in nearly zero pitch torsion on the air bearing.

Figure 7A:
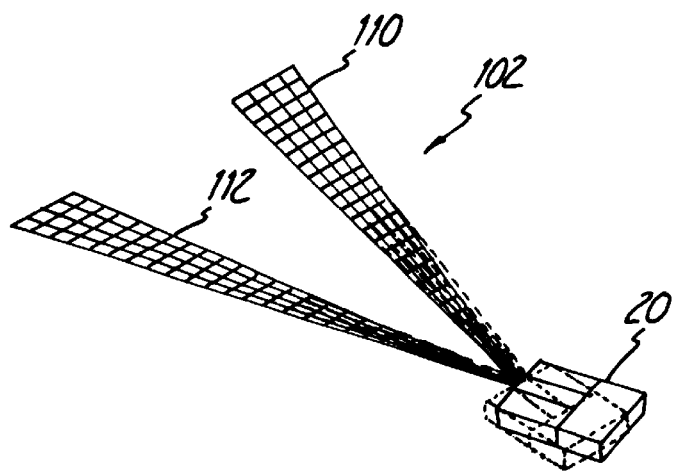
FIG. 7A is an isometric view of a finite element model of the suspension in FIG. 3A with a preload bend removed.

FIG. 7A is an isometric view of a finite element model of suspension 102 with the preload bend removed. Suspension 102 therefore provides zero preload force to slider/microactuator assembly 20. With the model shown in FIG. 7A, the suspension material lies in plane parallel with the disc surface when the suspension and slider are loaded into the disc drive.

Figure 7B:
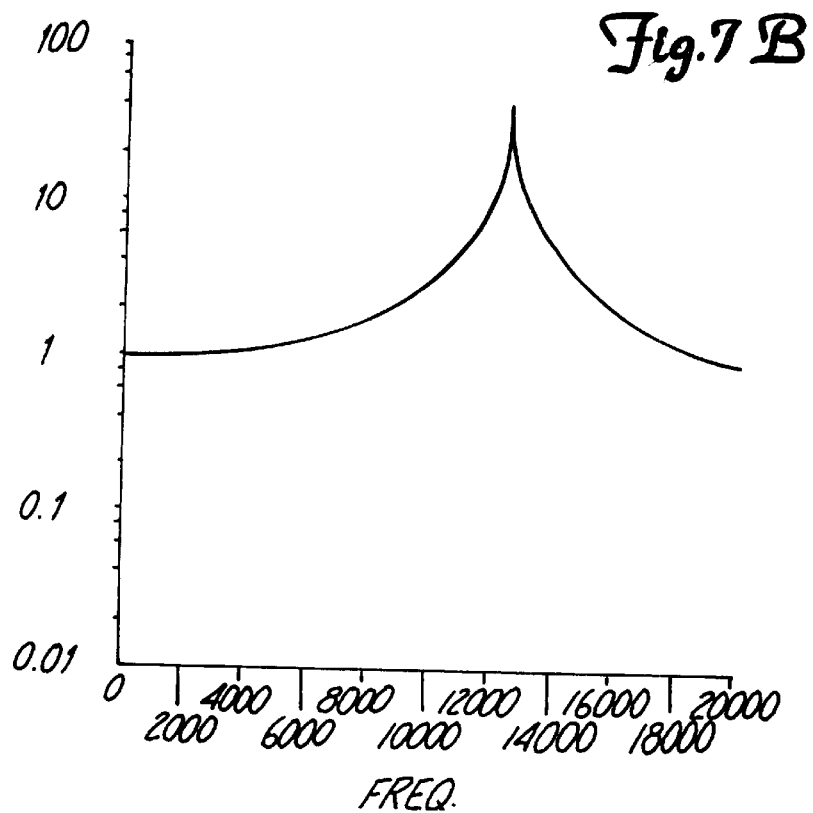
FIG. 7B is an "off-track bode plot" of the model shown in FIG. 7A.

FIG. 7B is an "off-track bode plot" which illustrates a frequency response amplitude ratio of recording head off-track displacement over the amount of accessing arm input motion. The suspension modeled in FIG. 7A had a single resonant mode of slider yawing at 12.6 KHz. The tapered beams modeled in FIG. 7A deflect with a constant curvature under a tip load. Therefore, a preload bend formed with a constant curvature along the entire length of the suspension would deflect to a substantially flat configuration as n FIG. 7A when the suspension is loaded into the disc drive. However, such a bend is difficult to obtain in practice, due to spring back effects in the bend forming process.

Figure 8A:
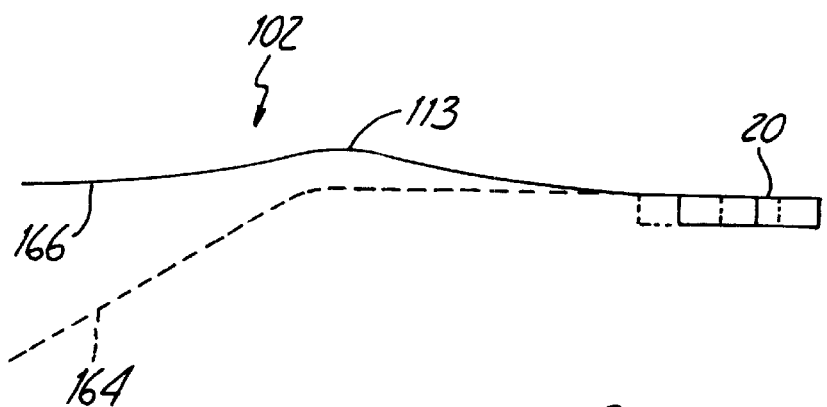
FIG. 8A is a side plan view of the model shown in FIG. 5A with a preload bend positioned at 50 percent of the suspension beam length.
Figure 8B:
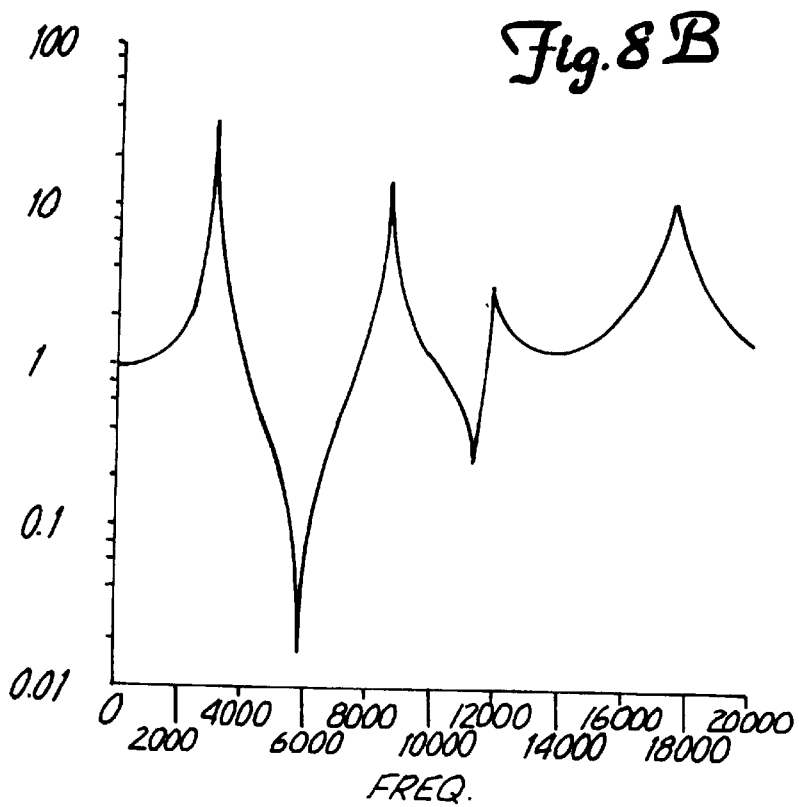
FIG. 8B is an off-track bode plot for the model shown in FIG. 8A.

FIG. 8A is a side plan view of the suspension model shown in FIG. 5A in an unloaded position 164 (shown in phantom) and in a loaded position 166, with preload bend 113 positioned at 50 percent of the distance between the track accessing arm and the leading end of slider/microatuator assembly 20. FIG. 8B is a corresponding off-track bode plot for the suspension model shown in. FIGS. 5A–5B. Several additional resonant peaks appear due to torsional modes of vibration within the suspension. The lowest frequency of these additional resonant peaks is 3.0 KHz.

Figure 9A:
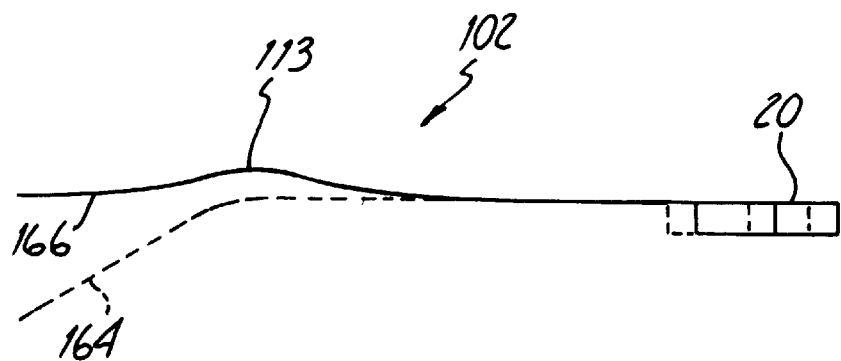
FIG. 9A is a side plan view of the model shown in FIG. 5A with a preload bend positioned at 35 percent of the suspension beam length.
Figure 9B:
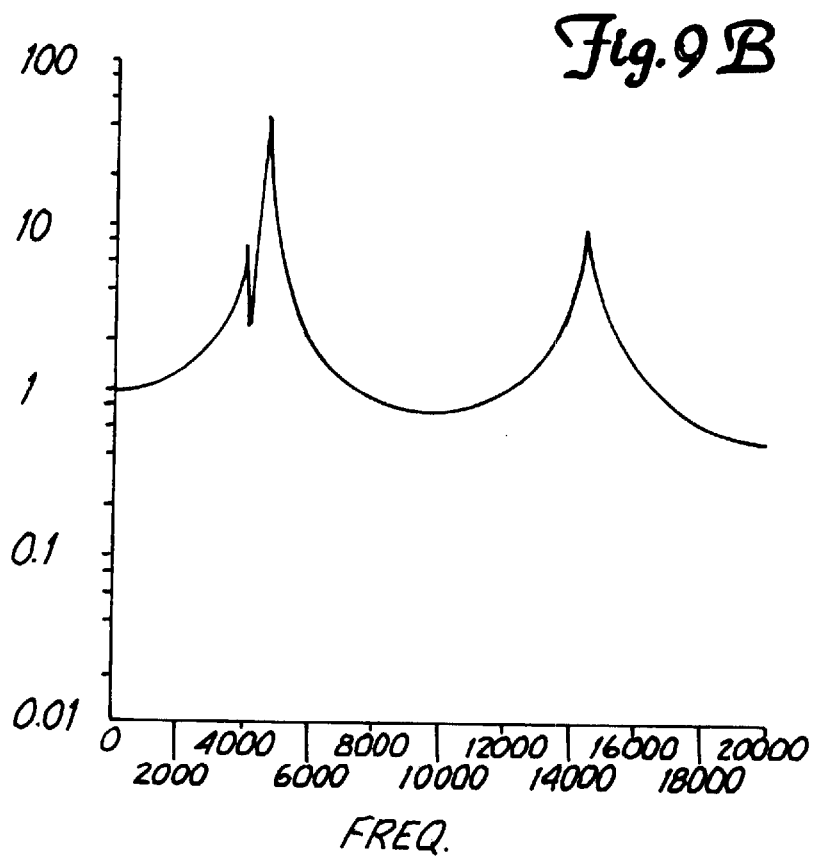
FIG. 9B is an off-track bode plot of the model shown in FIG. 9A.

FIG. 9A is a side plan view of the suspension model shown in FIG. 5A with preload bend 113 positioned at 35 percent of the distance between the track accessing arm and the leading end of slider/microatuator assembly 20. FIG. 9B is a corresponding off-track bode plot of the model shown in FIG. 9A. Only two resonant peaks remain, a torsion mode resonant peak at 4.0 KHz and a slider yaw mode resonant peak at 14.5 KHz.

Thus, the result shown in FIG. 9B suggest that the preload bend 113 be positioned at 35 percent of the suspension beam length to obtain an off-track bode plot with minimal resonant peaks, while the results shown in FIG. 6 suggests that the preload bend 113 be positioned at 50 percent of the suspension beam length to obtain zero pitch torsion at the air bearing load point. A suspension having a minimal mass and a single preload bend of a small radius of curvature therefore cannot give the desired combination of zero pitch torsion at the air bearing load point and an off-track bode plot with minimal resonant peaks.

Several solutions to this dilemma are possible in accordance with the suspension of present invention. First, the suspension can have a plan form other than the minimal mass configuration (which is shown in FIG. 3A) This solution would tend to undesireably reduce the shock threshold at which slider-disc separation occurs. Second, an additional bend can be formed in suspension beams 110 and 112 near suspension load point 114. The additional bend would be formed such that there is substantially zero pitch torsion at the air bearing load point 61. This solution would tend to increase the manufacturing cost due to the additional bend. Third, the stacking height at the track accessing arm can be increased. The stacking height is equal to the distance from the surface of the disc to the lower surface of the track accessing arm. Increasing the stacking height tends to reduce nose-down pitch torsion on slider assembly 20.

Figure 10A:
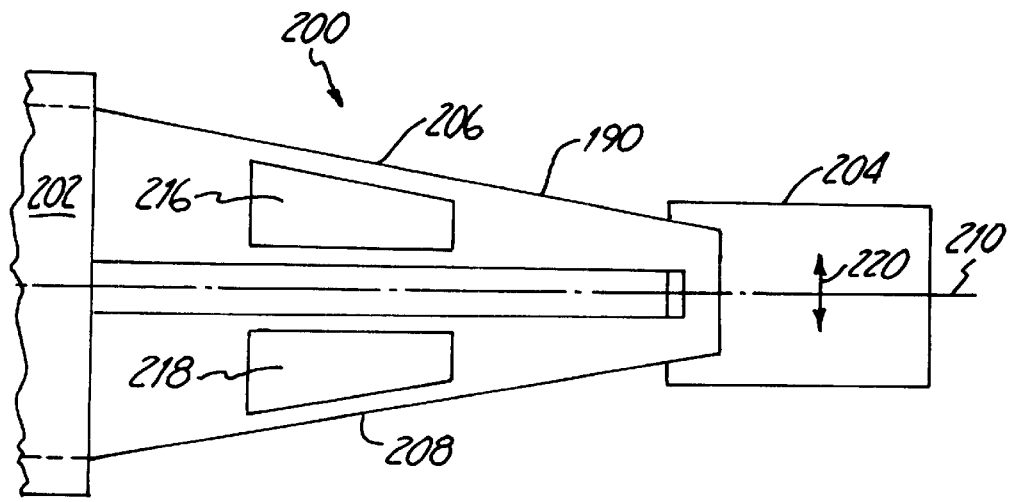
FIG. 10A is a top plan view of an actuator assembly having piezoelectric strips on suspension preload bends.

FIG. 10A is a top plan view of an actuator assembly 190 according to another alternative embodiment of the present invention. Actuator assembly 190 includes suspension 200, track accessing arm 202 and slider 204. As in the previous embodiments, suspension 200 includes laterally spaced suspension beams 206 and 208 which extend along longitudinal axis 210, between track accessing arm 202 and slider 204. However, in this embodiment, suspension beams 206 and 208 are attached directly to the back surface of slider 204.

Figure 10B:
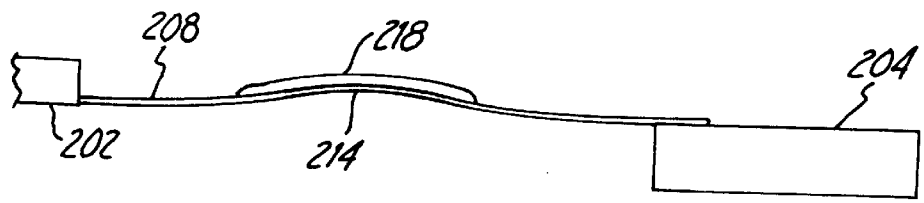
FIG. 10B is a side plan view of the actuator assembly shown in FIG. 10A.

FIG. 10B is a side plan view of actuator assembly 190. An elastically deformed preload bend 214 is formed in suspension beams 206 and 208 in a direction transverse to longitudinal axis 210. Piezoelectric strips 216 and 218 are attached to suspension 200 along the length of suspension beams 206 and 208, respectively. Piezoelectric strips 216 and 218 are positioned over the "humps" in suspension beams 206 and 208 which are the resultant shape of the elastically deformed preload bends 214. Piezoelectric strips 216 and 218 can be formed of a polymer such as polyvinylidene fluoride (PVDF) $CH_2$—$CF_2$.

Piezoelectric strips 216 and 218 are attached to suspension beams 206 and 208 with a conductive adhesive such that suspension 200 acts as a ground plane for each strip. Each strip has a thin electrode layer deposited on its top surface, to which control wires or flex circuit traces (not shown) can be bonded. Piezoelectric strips 216 and 218 have poles that are orientated such that the length of strips 216 and 218 along longitudinal axis 212 will expand when a positive voltage potential is applied between the top electrode and the ground plane and will contract when a negative voltage potential is applied between the top electrode and the ground plane.

Strips 216 and 218 act as a self-contained track-seeking microactuator and preload control device. Since strips 216 and 218 are bonded to the humps on suspension beams 206 and 208, the hump on a first beam may be flattened by contracting its strip while the hump on the second beam may be exaggerated by expanding its strip. This action extends the length of the first-beam while shortening the length of the second beam, causing slider 204 to shift its track registration in an off-track direction 220. The combination of contraction on one suspension beam and expansion on the other suspension beam also changes the preload applied by each suspension beam. The following table shows four general modes of microactuation for track seeking and preload control:

| BEAM 206 VOLTAGE | BEAM 208 VOLTAGE | PRELOAD CHANGE | TRACKING CHANGE |
|---|---|---|---|
| − | − | Reduced | None |
| + | − | None | Seek to Beam 208 Side |
| − | + | None | Seek to Beam 206 Side |
| + | + | Increased | None |

These modes of microactuation may be used in combination to maintain a desired flying stability during track seeking. The preload control modes may be used alone to allow a relatively high flying height with a low preload force when the disc drive is idle, or to allow a low flying height with a high preload force when the disc drive is accessing data. The track seeking microactuation mode may be used in a traditional manner for centering the recording head on a desired data track or for generating a slider/disc stiction release jogging motion during slider take-off from the disc surface. The preload control modes may be used to load and unload slider 204 from the disc during start up and shut down, as well as to control flying height.

Although the present invention has been described with reference to preferred embodiments, workers skilled in the art will recognize that changes may be made in form and detail without departing from the spirit and scope of the invention.

What is claimed is:

1. A disc drive comprising:
   a data storage disc; and
   suspension means for carrying a transducer used to read and write information onto the data storage disc, wherein the suspension means comprises:

a longitudinal axis;

a proximal mounting section for mounting to a rigid track accessing arm;

a distal mounting section for supporting a slider assembly; and first and second laterally spaced suspension beams extending from the proximal mounting section to the distal mounting section and each having a width which decreases linearly from the proximal mounting section to the distal mounting section.

2. The disc drive of claim 1 wherein the first and second suspension beams have inside and outside edges relative to the longitudinal axis and are flat from the inside edges to the outside edges as the beams extend from the proximal mounting section to the distal mounting section, and wherein the suspension means further comprises a first preload bend formed in the first and second suspension beams transverse to the longitudinal axis.

3. The disc drive of claim 2 wherein the suspension means is formed of a single, unitary piece of material.

4. The disc drive of claim 2 wherein the first and second beams have a geometry selected such that a specified bending force applied to the first and second suspension beams results in a specified bending stress level in the first and second suspension beams which is substantially uniform along the first and second suspension beams.

5. The disc drive of claim 4 wherein the first and second suspension beams have a minimum mass such that substantially no material may be removed from the first and second suspension beams without increasing bending stress in the first and second beams beyond the specified bending stress level.

6. The disc drive of claim 2 wherein the distal mounting section comprises a first mounting pad formed at a distal end of the first suspension beam, a second mounting pad formed at a distal end of the second suspension beam and a bridge extending between the first and second mounting pads.

7. A disc drive comprising:

a data storage disc; and suspension means for carrying a transducer used to read and write information onto the data storage disc and for supplying a preload force to the transducer in a direction normal to the disc surface while spreading elastic strain along substantially an entire longitudinal axis of the suspension means.

8. The disc drive of claim 7 wherein the suspension means comprises:

a longitudinal axis;

a proximal mounting section for mounting to a rigid track accessing arm;

a distal mounting section for supporting a slider assembly;

first and second laterally spaced suspension beams extending from the proximal mounting section to the distal mounting section, wherein the first and second suspension beams have inside and outside edges relative to the longitudinal axis and are flat from the inside edges to the outside edges as the beams extend from the proximal mounting section to the distal mounting section; and a first preload bend formed in the first and second suspension beams transverse to the longitudinal axis.

9. The disc drive of claim 8 wherein the suspension means is formed of a single, unitary piece of material.

10. The disc drive of claim 8 wherein the first and second suspension beams have a substantially constant width from the proximal mounting section to the distal mounting section.

11. The disc drive of claim 8 wherein the first and second suspension beams each have a width which decreases linearly between the proximal mounting section and the distal mounting section.

12. The disc drive of claim 8 wherein the first and second beams have a geometry selected such that a specified bending force applied to the first and second suspension beams results in a specified bending stress level in the first and second suspension beams which is substantially uniform along the first and second suspension beams.

13. The disc drive of claim 12 wherein the first and second suspension beams have a minimum mass such that substantially no material may be removed from the first and second suspension beams without increasing bending stress in the first and second beams beyond the specified bending stress level.

14. The disc drive of claim 8 wherein the distal mounting section comprises a first mounting pad formed at a distal end of the first suspension beam, a second mounting pad formed at a distal end of the second suspension beam and a bridge extending between the first and second mounting pads.

15. A disc drive suspension comprising:

means for carrying a transducer used to read and write information onto a data storage disc; and means for supplying a preload force to the transducer such that bending stress developed in the suspension due to the preload force is substantially uniform along substantially an entire length of the disc drive suspension.

16. The disc drive suspension of claim 15 wherein:

the means for carrying comprises:

a longitudinal axis;

a proximal mounting section for mounting to a rigid track accessing arm;

a distal mounting section for supporting a slider assembly; and first and second laterally spaced suspension beams lid extending from the proximal mounting section to the distal mounting section, wherein the first and second suspension beams have inside and outside edges relative to the longitudinal axis and are flat from the inside edges to the outside edges as the beams extend from the proximal mounting section to the distal mounting section; and the means for supplying a preload force comprises:

a first preload bend formed in the first and second suspension beams transverse to the longitudinal axis.

17. The disc drive suspension of claim 16 wherein the suspension is formed of a single, unitary piece of material.

18. The disc drive suspension of claim 16 wherein the first and second suspension beams each have a width which decreases linearly between the proximal mounting section and the distal mounting section.

19. The disc drive suspension of claim 16 wherein the first and second suspension beams have a minimum mass such that substantially no material may be removed from the first and second suspension beams without increasing the bending stress in the first and second beams beyond a specified bending stress level.

* * * * *

UNITED STATES PATENT AND TRADEMARK OFFICE
CERTIFICATE OF CORRECTION

PATENT NO. : 6,449,127 B1
DATED : September 10, 2002
INVENTOR(S) : Crane

It is certified that error appears in the above-identified patent and that said Letters Patent is hereby corrected as shown below:

Title page,
Item [56], References Cited please add,
-- 5,065,268     11/21/91        Hagen                   360/104
   5,657,188     8/12/97         Jurgenson et al.        360/106 --.
OTHER PUBLICATIONS please add,
-- Ohwe, Takeshi, "Wireless Pico Suspension Improves Drive Reliability", Data Storage, October 1997. --

Column 12,
Line 40, delete "lid".

Signed and Sealed this

Twentieth Day of May, 2003

JAMES E. ROGAN
*Director of the United States Patent and Trademark Office*